United States Patent
Belloso

(10) Patent No.: US 6,179,078 B1
(45) Date of Patent: Jan. 30, 2001

(54) FUEL EFFICIENT AND INEXPENSIVE AUTOMOBILE

(76) Inventor: Gregorio M. Belloso, 5302 Chinaberry Dr., Salisbury, MD (US) 21801

( * ) Notice: Under 35 U.S.C. 154(b), the term of this patent shall be extended for 0 days.

(21) Appl. No.: 09/546,401

(22) Filed: Apr. 10, 2000

Related U.S. Application Data

(63) Continuation-in-part of application No. 09/085,768, filed on May 28, 1998, now abandoned.

(51) Int. Cl.$^7$ .................................................... B60K 1/00
(52) U.S. Cl. ........................................... 180/69.6; 180/65.2
(58) Field of Search ......................... 180/65.1, 65.2, 180/65.3, 65.4, 65.6, 65.8, 69.6, 297, 350, 351, 907, 60; 477/2, 3, 54.1, 59, 60, 61, 62

(56) References Cited

U.S. PATENT DOCUMENTS

| | | | | |
|---|---|---|---|---|
| 677,854 | * | 7/1901 | Canda, et al. ..................... | 180/69.6 |
| 692,880 | * | 2/1902 | Lemp ................................ | 180/69.6 |
| 736,459 | * | 8/1903 | Synnestvedt ..................... | 180/69.6 |
| 845,850 | * | 5/1907 | Carter ............................... | 180/69.6 |
| 893,498 | * | 7/1908 | Higdon ............................. | 180/297 |
| 1,065,982 | * | 7/1913 | Stewart ....................... | 180/65.2 X |
| 1,200,379 | * | 10/1916 | Lunsford ......................... | 180/297 |
| 1,849,755 | * | 3/1932 | Fielder ............................ | 180/69.6 |
| 1,900,470 | * | 3/1933 | Smith .............................. | 180/69.6 |
| 1,944,256 | * | 1/1934 | Miller et al. .................... | 180/69.6 |
| 2,374,196 | * | 4/1945 | Harbers ........................... | 180/69.6 |
| 2,419,911 | * | 4/1947 | Ormsby ........................... | 180/69.6 |
| 2,462,902 | * | 3/1949 | Rockwell, et al. ............... | 180/69.6 |
| 2,731,097 | * | 1/1956 | Zeilman et al. ................. | 180/69.6 |
| 3,115,945 | * | 12/1963 | Dry et al. ....................... | 180/297 X |
| 3,305,038 | * | 2/1967 | Carter ........................... | 180/350 X |
| 3,521,722 | * | 7/1970 | Dimonte ........................ | 180/69.6 |
| 3,776,354 | * | 12/1973 | Duclo et al. . | |
| 3,799,283 | * | 3/1974 | Freber ............................ | 180/56 |
| 4,306,630 | * | 12/1981 | Monte et al. . | |
| 4,475,611 | * | 10/1984 | Fisher . | |
| 4,481,841 | * | 11/1984 | Abthoff et al. ............... | 180/69.6 X |
| 4,505,353 | * | 3/1985 | Van der Lely ................. | 180/69.6 |
| 4,697,660 | * | 10/1987 | Wu et al. ...................... | 180/297 X |
| 4,763,538 | * | 8/1988 | Fujita et al. .................. | 180/65.2 X |
| 4,869,332 | * | 9/1989 | Fujita et al. .................. | 180/65.2 |
| 5,024,113 | * | 6/1991 | Ito et al. ....................... | 180/65.2 X |
| 5,253,724 | * | 10/1993 | Prior . | |
| 5,429,543 | * | 7/1995 | Tilbor et al. . | |
| 5,667,029 | * | 9/1997 | Urban et al. .................. | 180/65.2 |
| 5,957,991 | * | 9/1999 | Yasuda . | |

FOREIGN PATENT DOCUMENTS

4204384A1 * 8/1993 (EP) ................................. 180/69.6

* cited by examiner

Primary Examiner—Brian L. Johnson
Assistant Examiner—Gerald Klebe
(74) Attorney, Agent, or Firm—Norman B. Rainer

(57) ABSTRACT

An automotive wheeled vehicle of light weight and improved fuel efficiency has first and second laterally opposed drive wheels mounted upon a stationary axle positioned transversely to the direction of vehicle motion, each of the drive wheels being driven by separate and independent internal combustion engines to provide controlled forward motion of the vehicle. An electric motor provides controlled reverse motion of the vehicle. One engine serves as a primary engine, and the second engine serves to provide auxiliary power when the primary engine is operating.

5 Claims, 4 Drawing Sheets

FUEL EFFICIENT AND INEXPENSIVE AUTOMOBILE

RELATED APPLICATIONS

This Application is a continuation-in-part of U.S. patent application Ser. No. 09/085,768 filed, May 25, 1998 now abandoned.

BACKGROUND OF THE INVENTION

1. Field of the Invention

This invention relates to automotive vehicles, and more particularly concerns passenger-carrying automobiles propelled by internal combustion engines.

2. Description of the Prior Art

A conventional automobile is powered by an engine which transmits power through a transmission, thence through a differential to axles which drive a pair of wheels located on opposite lateral sides of the vehicle.

The size and power capacity of the engine is a compromise between one sufficiently large and powerful to provide adequate acceleration and climbing power, and one small enough to have acceptable fuel efficiency. Although it is known that smaller engines, which generate less power, are capable of maintaining a vehicle at a selected cruising speed and of achieving high fuel efficiency, the smaller engines have not been found practical because their low power output is insufficient to provide adequate vehicle acceleration. However, more powerful, heavier engines are more costly, and increase fuel consumption per mile travelled.

Considerable prior art exists in the area of improving the efficiency of operation of automotive vehicles. The predominant objectives of most approaches involve minimization of vehicle weight, reduction of frictional losses, matching of engine size to power requirements, and improvement of the energy transfer efficiency of the transmission and differential. In fact, many race cars, which require good fuel efficiency, are designed without a differential, and utilize either a simple, light-weight transmission, or no transmission at all. By eliminating the weight and energy transfer losses attributable to the transmission and differential, there is a considerable enhancement of fuel efficiency.

The use of multiple light-weight engines in place of a single large engine in order to achieve fuel efficiency is disclosed in U.S. Pat. No. 4,481,841. Other disclosures of wheeled vehicles employing multiple engines or motors are found in U.S. Pat. Nos. 4,306,630; 4,475,611; 5,253,724; and 5,429,543.

U.S. Pat. No. 2,462,902 to Rockwell, et. al. concerns a vehicle having paired front wheels mounted upon a rotating front axle and paired rear wheels mounted upon a rotating rear axle. A main engine drives the rear axle, and a booster engine drives the front axle. Associated with the main engine is a power train having a clutch, speed change transmission, propeller shaft, two speed rear axle drive gear, and differential. The booster engine has a power train consisting of a clutch, speed change transmission, propeller shaft, disengageable rear drive, and differential. Although the dual engines of Rockwell, et. al. provide some versatility of operation, the several requisite power train components increase the cost and weight of the vehicle.

U.S. Pat. No. 3,799,283 to Freber discloses a go-cart having two engines, each coupled by way of a centrifugal friction clutch to a rear drive axle. In such manner of construction, unless both engines are operating at the same speed to activate the clutches, one of the clutches will not be engaged, causing the output of the slower engine to be wasted.

U.S. Pat. No. 3,776,354 to Duclo, et. al. discloses an engine-torque converter unit adapted to drive the propulsion track of a snowmobile by way of an intervening jack-shaft. Although such system facilitates the delivery of controlled power to a propulsion drive means, it is not obviously applicable to a wheeled vehicle propelled by two separate engines.

None of the aforesaid disclosures however, are concerned with the dual objective of reducing the cost of the vehicle and improving fuel efficiency.

It is accordingly an object of the present invention to provide an automobile amenable to manufacture at reduced cost.

It is another object of this invention to provide an automobile as in the foregoing object which has improved efficiency of fuel consumption.

These objects and other objects and advantages of the invention will be apparent from the following description.

SUMMARY OF THE INVENTION

The above and other beneficial objects and advantages are accomplished in accordance with the present invention by an automotive wheeled vehicle having a chassis and first and second laterally opposed drive wheels mounted upon an axle journaled to said chassis orthogonally to the direction of vehicle motion, said vehicle further comprising:

1) a primary internal combustion engine coupled by first adjustable power transmission means to said first drive wheel to impart forward propulsive movement to said vehicle, 2) a secondary internal combustion engine coupled by second adjustable power transmission means to said second drive wheel to augment the forward propulsive movement provided by said primary engine, and 3) an electric motor coupled by third adjustable power transmission means to said axle in a manner to impart reverse movement to said vehicle.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
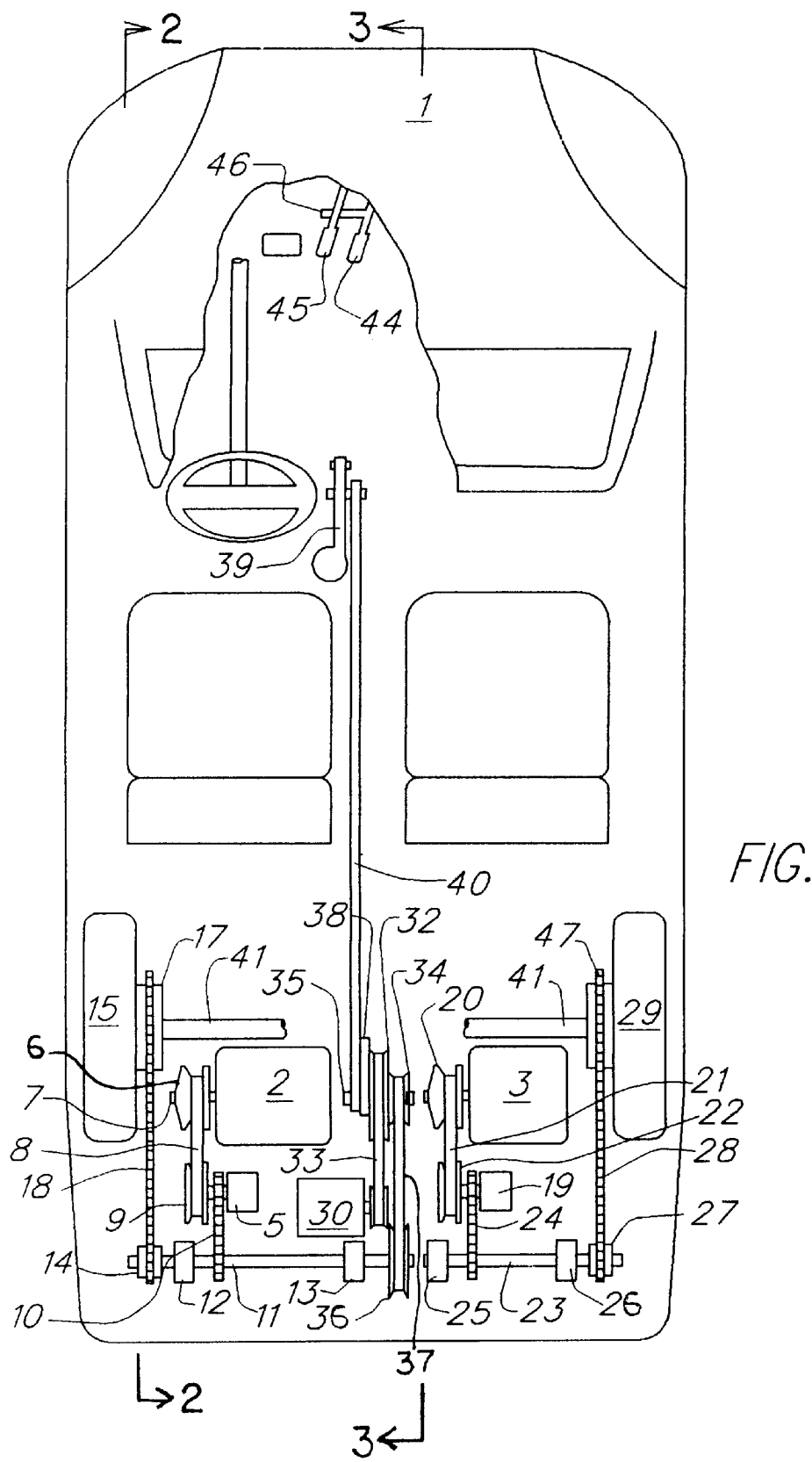
FIG. 1 is a top view, partly in section, of an embodiment of the vehicle of the present invention.

Referring now in detail to the drawings, there is shown an automobile 1 equipped with a primary engine 2 and a secondary engine 3 which are both mounted on the chassis 4.

The primary engine 2 is coupled to a first adjustable power transmission means in the form of continuously variable ratio first torque converter 5 whose drive pulley 6 is mounted on the output shaft 7 of primary engine 2. The drive pulley 6 transmits power through the torque converter belt 8 to the driven pulley 9 of the torque converter 5 which then transmits the power via a sprocket to chain 10, thence via a sprocket to first jack shaft 11. Jack shaft 11 is rotatably mounted on chassis 4 through jack shaft bearings 12 and 13. At the outer lateral end of jack shaft 11 is mounted the jack shaft drive sprocket 14 which is connected to wheel sprocket 16 by first drive chain 18. Wheel sprocket 16 is fixedly mounted on brake drum 17 to which first drive wheel 15 is attached by lug nuts. Said first drive wheel is rotatably mounted upon stationary axle 41.

Figure 2:
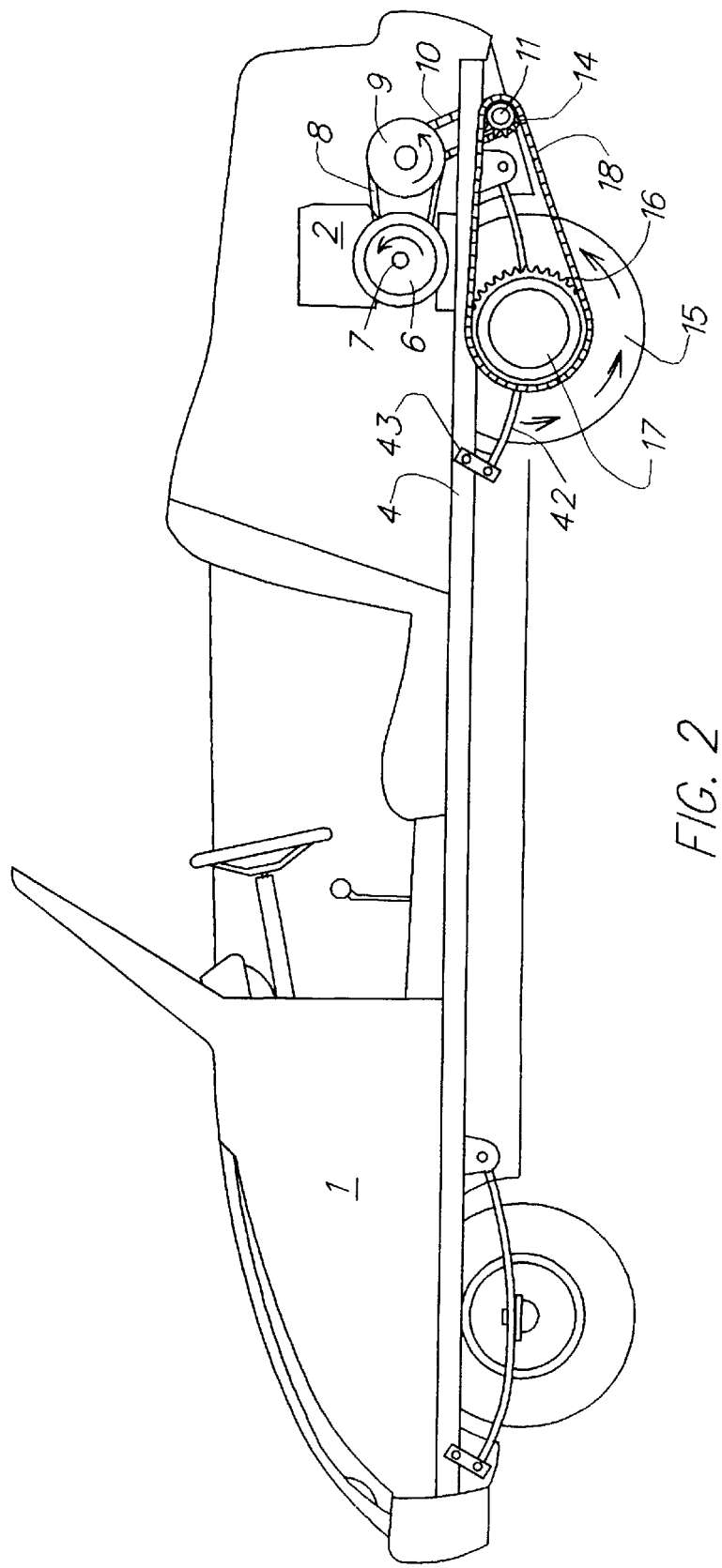
FIG. 2 is a sectional view taken in the direction of the arrows upon the line 2—2 of FIG. 1.
Figure 4:
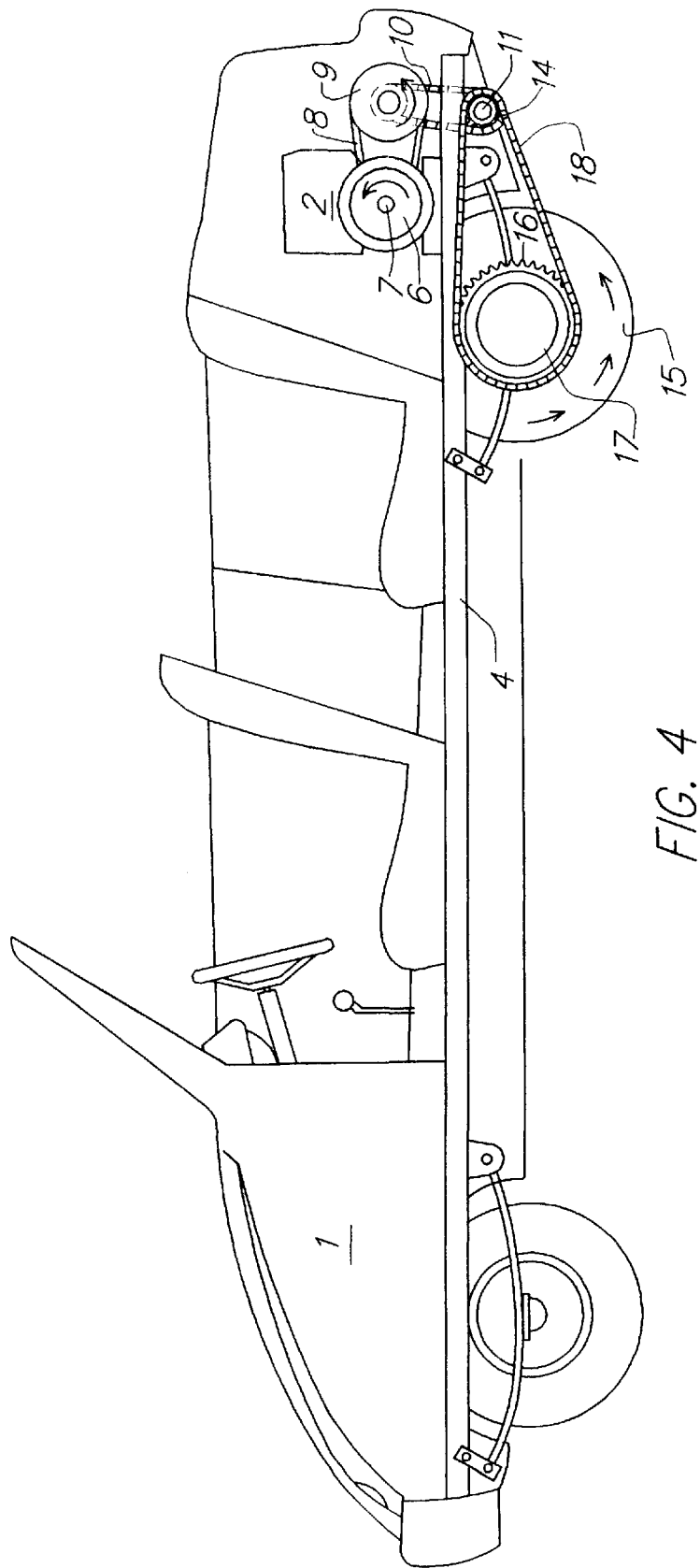
FIG. 4 is a view similar to FIG. 2 of an alternative embodiment of the vehicle of this invention.

When the primary engine 2 is in operation at the desired engagement speed, it turns the torque converter pulleys 6 and 9 in the direction of the arrows; and power is thereby transmitted from torque converter 5 to the jack shaft 11 through chain 10. Power is then transmitted from jack shaft 11 through drive sprocket 14 to chain 18 to wheel sprocket 16, causing wheel 15 to turn in the direction of the arrows shown in FIGS. 2 and 4, thus driving the vehicle forward.

The size and power output of primary engine 2 is such that it maximizes fuel economy, and produces enough power to maintain cruising speed and permit minor adjustments in speed as are necessary when cruising on a highway.

Secondary engine 3 is equipped with secondary torque converter 19 whose drive pulley 20 is connected to driven pulley 22 by belt 21. Torque converter 19 transmits power to secondary jack shaft 23 through chain 24. Secondary jack shaft 23 is rotatably mounted on chassis 4 through bearings 25 and 26.

When secondary engine 3 is in operation it transmits power through secondary torque converter 19, thence through chain 24 to secondary jack shaft 23, thence through drive sprocket 27 which in turn drives sprocket 47 attached to second drive wheel 29 through secondary drive chain 28, thus providing additional power and traction to drive the vehicle forward. Said second drive wheel is rotatably mounted upon stationary axle 41.

When both primary engine 2 and secondary engine 3 are operated together, the vehicle develops performance characteristics comparable to current conventional single-engined automobiles, yet when cruising on a single engine it. Attains fuel economy which is not achievable with a conventional single-engined automobile having similar weight and total power output. The torque converters cause equal propulsive force to be delivered to each of said drive wheels rotatively mounted on stationary axle 41. Said axle is connected to chassis 4 in conventional manner by springs 42 and hangers 43.

Power for reverse movement of the vehicle is supplied by a battery-driven electric motor 30, on whose output shaft is mounted a motor pulley 31 which drives large idler pulley 32 by means of belt 33. Small idler pulley 34 is fixedly attached to large idler pulley 32, and together they rotate freely on idler shaft 35. Small idler pulley 34 drives jack shaft pulley 36 through drive belt 37. In this embodiment, the jack shaft pulley 36 is fixedly mounted on jack shaft 11. An alternative embodiment may employ means for releasably engaging jack shaft pulley 36 on jack shaft 11 such as through a clutch type mechanism or sliding gear means, not shown.

Idler shaft 35 is transversely fixed to idler support 38 which is pivotably anchored on chassis 4 in a manner that allows idler support 38 to swivel forward and backward. Connecting rod 40 is pivotably connected to idler shaft 35 at one end and to control rod 39 at the other. Control rod 39 is pivotably anchored to the chassis 4 in a manner that allows it to swivel forward and rearward. Forward and rearward movement of the control rod 39 is thereby translated to forward and rearward movement of idler shaft 35, hence of idler pulleys 32 and 34.

Figure 3:
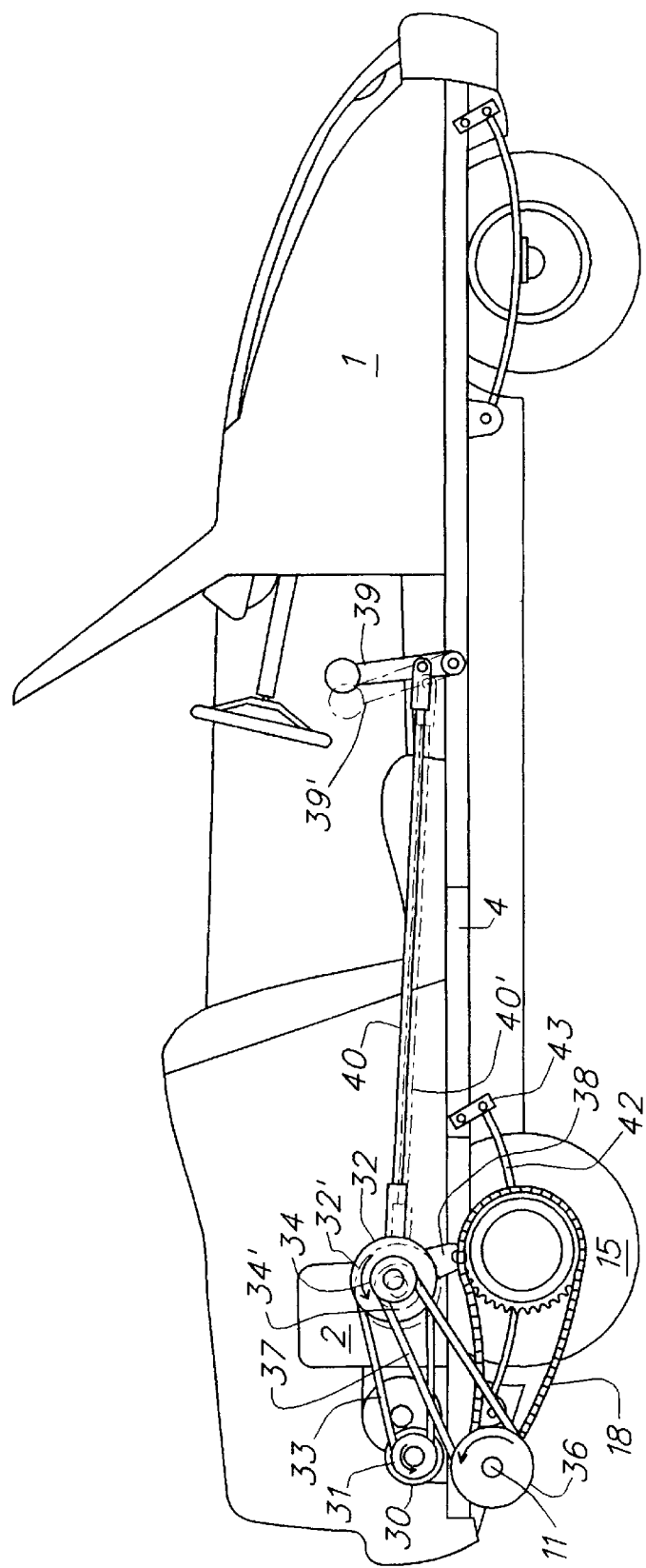
FIG. 3 is a sectional view taken in the direction of the arrows upon the line 3—3 of FIG. 1.

To move the vehicle in reverse the electric motor 30 is switched on and the control rod 39 is moved forward to the position indicated by the solid lines in the drawings. This moves the connecting rod 40, idler shaft 35 and idler pulleys 32 and 34 to their forward positions, likewise shown by the solid lines in the drawings. The electric motor 30 is positioned so that it turns in the direction of the arrow shown on the motor pulley 31. With idler pulleys 32 and 34 in the forward position, tension is placed on belts 33 and 37, causing the idler pulleys 32 and 34 to turn in the direction of the arrows, and also causes jack shaft pulley 36 and jack shaft 11 to turn in the same direction. Power from jack shaft 11 is then transmitted through drive chain 18 to driving wheel 15, causing the latter to turn in the direction of the arrow shown in FIG. 3 and to move the vehicle rearwardly. Since vehicles are normally moved in reverse for only short distances it is estimated that for normal use power stored in one or two standard lead acid batteries will suffice.

To disengage the electric motor 30, control rod 39 is moved rearward to the 39' position. This moves connecting rod 40 to the 40' position, moving idler pulleys 32 and 34 to the 32' and 34' positions, respectively, thereby loosening the tension on belts 33 and 37, effectively disengaging idler pulley 32 from motor pulley 31, and disengaging idler pulley 34 from jack shaft pulley 36.

Economy gas pedal 44 controls the operation of primary engine 2 through suitable connection means (not shown). Power gas pedal 45 controls the operation of secondary engine 3 through suitable connection means (not shown). Economy gas pedal 44 has an extension 46 which is positioned beneath power gas pedal 45 so that when power gas pedal 45 is depressed, the economy gas pedal is simultaneously depressed along with it. Depression of the economy gas pedal 44, however, does not cause any movement on power gas pedal 45. Thus, when power gas pedal 45 is depressed, power is produced simultaneously by both primary engine 2 and secondary engine 3 for rapid acceleration, yet when only economy gas pedal 44 is depressed only primary engine 2 is operated to provide power for economical cruising.

The drive system of the present invention is preferably utilized on four-wheeled passenger vehicles having the aforesaid first and second drive wheels, and an additional pair of transversely opposed wheels positioned so as to be disposed in a rectangular array in combination with said drive wheels. The forward-most of said pairs of wheels serves as the steering wheels. Although the drive system of this invention has been exemplified as driving a rearward-most pair of wheels, the system may be utilized in conjunction with a forward-most pair of wheels or with both front and rear pairs of wheels. In still another embodiment, the vehicle may be equipped with a pair of rear wheels driven by the system of this invention, and a single forward steering wheel disposed upon the longitudinal axis of the vehicle, forming a triangular array in conjunction with said rear wheels.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. An automotive vehicle having a chassis, at least one front wheel, and first and second laterally opposed drive wheels mounted upon a stationary axle disposed orthogonally to the direction of vehicle motion, said vehicle further comprising:
   a) brake drums affixed to said drive wheels in facing relationship,
   b) wheel sprockets fixedly mounted on said brake drums and a drive chain engaging each of said wheel sprockets,
   c) a primary internal combustion engine having a rotating output shaft coupled by a continuously variable ratio first torque converter to the drive chain associated with said first drive wheel to impart forward propulsive movement to said vehicle,
   d) a secondary internal combustion engine having a rotating output shaft coupled by a continuously variable ratio second torque converter to the drive chain associated with said second drive wheel to augment the forward propulsive movement provided by said primary engine,
   e) pedals associated with said chassis for selectively activating either said primary engine by itself or both engines at once, and
   f) an electric motor coupled to one of said drive wheels in a manner to impart reverse movement to said vehicle.

2. The vehicle of claim 1 further provided with first and secondary jack shafts journaled to said chassis in parallel relationship to said output shafts and adapted to be separately and independently rotated by said torque converters, said jack shafts having drive sprockets mounted thereupon which engage said drive chains.

3. The vehicle of claim 1 having two front wheels and two rear wheels, said four wheels being disposed in a rectangular array.

4. The vehicle of claim 3 wherein said rear wheels are the drive wheels.

5. The vehicle of claim 3 wherein said front wheels are the drive wheels.

* * * * *